United States Patent
Kim et al.

(10) Patent No.: US 12,266,810 B2
(45) Date of Patent: Apr. 1, 2025

(54) BATTERY CELL ASSEMBLY, METHOD OF MANUFACTURING THE SAME AND BATTERY MODULE INCLUDING BATTERY CELL ASSEMBLY

(71) Applicant: LG Energy Solution, Ltd., Seoul (KR)

(72) Inventors: Seung Joon Kim, Daejeon (KR); Young Bum Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 715 days.

(21) Appl. No.: 17/437,664

(22) PCT Filed: Feb. 4, 2020

(86) PCT No.: PCT/KR2020/001620
§ 371 (c)(1),
(2) Date: Sep. 9, 2021

(87) PCT Pub. No.: WO2020/230980
PCT Pub. Date: Nov. 19, 2020

(65) Prior Publication Data
US 2022/0166097 A1  May 26, 2022

(30) Foreign Application Priority Data
May 14, 2019  (KR) .................. 10-2019-0056450

(51) Int. Cl.
*H01M 50/209* (2021.01)
*H01M 50/211* (2021.01)
*H01M 50/60* (2021.01)

(52) U.S. Cl.
CPC ....... *H01M 50/209* (2021.01); *H01M 50/211* (2021.01); *H01M 50/60* (2021.01)

(58) Field of Classification Search
CPC ... H01M 50/209; H01M 50/60; H01M 50/211
See application file for complete search history.

(56) References Cited

U.S. PATENT DOCUMENTS

| 5,683,752 | A | 11/1997 | Popp et al. |
| 2007/0224498 | A1 | 9/2007 | Kim et al. |
| 2013/0236768 | A1 | 9/2013 | Park et al. |
| 2014/0157584 | A1 | 6/2014 | Park et al. |
| 2019/0348650 | A1* | 11/2019 | Nakamoto ........ H01M 10/0481 |

(Continued)

FOREIGN PATENT DOCUMENTS

| CA | 3072041 A1 | 2/2019 | |
| CN | 1428009 A * | 7/2003 | ............ H01M 2/361 |

(Continued)

OTHER PUBLICATIONS

KR 20200109127 English Translation (Year: 2019).*

(Continued)

*Primary Examiner* — Jimmy Vo
(74) *Attorney, Agent, or Firm* — Lerner David LLP

(57) ABSTRACT

A method of manufacturing a battery cell assembly in which a plurality of battery cells are stacked includes a step of coupling battery cells adjacent to each other among the plurality of battery cells using a one-component liquid material, wherein the one-component liquid material is coated onto at least one battery cell of the battery cells adjacent to each other by a spray-coating method.

10 Claims, 4 Drawing Sheets

(56) References Cited

U.S. PATENT DOCUMENTS

| | | | |
|---|---|---|---|
| 2020/0172697 A1* | 6/2020 | Horiuchi | ............ B29C 65/4865 |
| 2020/0259156 A1 | 8/2020 | Motohashi et al. | |
| 2020/0270480 A1 | 8/2020 | Tong | |

FOREIGN PATENT DOCUMENTS

| | | | | |
|---|---|---|---|---|
| JP | H02137922 | A | 5/1990 | |
| JP | H06206023 | A | 7/1994 | |
| JP | 2721903 | B2 | 3/1998 | |
| JP | 2002279380 | A | 9/2002 | |
| JP | 2004189933 | A | 7/2004 | |
| JP | 2005269732 | A | 9/2005 | |
| JP | 2015002264 | A | 1/2015 | |
| JP | 6472858 | B1 | 2/2019 | |
| JP | 2019031646 | A | 2/2019 | |
| JP | 2019067679 | A | 4/2019 | |
| JP | 2020526637 | A | 8/2020 | |
| KR | 100942986 | B1 | 2/2010 | |
| KR | 20100093988 | A | 8/2010 | |
| KR | 101217449 | B1 | 1/2013 | |
| KR | 20130103437 | A | 9/2013 | |
| KR | 20150037315 | A | 4/2015 | |
| KR | 20150111160 | A | 10/2015 | |
| KR | 20170024669 | A | 3/2017 | |
| KR | 20200109127 | A * | 9/2020 | ............ H01M 50/54 |
| WO | WO-2014157419 | A1 * | 10/2014 | ........ H01M 10/0481 |
| WO | 2018163708 | A1 | 9/2018 | |
| WO | 2019012398 | A1 | 1/2019 | |

OTHER PUBLICATIONS

CN 1428009 English Translation (Year: 2003).*
Search Report dated Dec. 1, 2022 from the Office Action for Chinese Application No. 202080027887.7 issued Dec. 9, 2022, 3 pages.
International Search Report for Application No. PCT/KR2020/001620, dated Jun. 2, 2020, 3 pages.

* cited by examiner

BATTERY CELL ASSEMBLY, METHOD OF MANUFACTURING THE SAME AND BATTERY MODULE INCLUDING BATTERY CELL ASSEMBLY

CROSS-REFERENCE TO RELATED APPLICATIONS

This application is a national phase entry under 35 U.S.C. § 371 of International Application No. PCT/KR2020/001620, filed Feb. 4, 2020, published in English, which claims the benefit of Korean Patent Application No. 10-2019-0056450 filed on May 14, 2019 with the Korean Intellectual Property Office, the disclosures of which are incorporated herein by reference in their entireties.

TECHNICAL FIELD

The present disclosure relates to a battery cell assembly and a method of manufacturing the same, and more particularly, to a battery cell assembly capable of reducing defects in the process and improving profitability, and a method of manufacturing the same.

BACKGROUND ART

Secondary batteries, which are easily applied to various product groups and have electrical characteristics such as high energy density, are universally applied not only for a portable device but also for an electric vehicle (EV) or a hybrid electric vehicle (HEV), an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Preferably, the middle- or large-sized battery module is manufactured so as to have as small a size and weight as possible. Consequently, a prismatic battery or a pouch-shaped battery, which can be stacked with high integration and has a small weight to capacity ratio, is usually used as a battery cell of the middle- or large-sized battery module. Especially, much interest is currently focused on the pouch-shaped battery, which uses an aluminum laminate sheet as a battery cell.

FIG. 1 is a perspective view showing a conventional pouch-shaped battery. Referring to FIG. 1, the secondary battery 10 has a structure in which two electrode leads 11 and 12 are opposed to each other and protrude from one end 14a and the other end 14b of the battery body 13, respectively, and is manufactured by connecting them with both ends 14a and 14b of the battery case 14 and both side surfaces 14c in a state where the electrode assembly (not shown) is housed in the battery case 14.

The battery case is generally composed of a laminated structure of a resin layer/metal thin film layer/resin layer. For example, in the case where the surface of the battery case is composed of an O (oriented)-nylon layer, when a plurality of battery cells are stacked in order to form a middle- or large-sized battery module, they tend to slip easily due to an external impact. Therefore, in order to prevent this and maintain a stable laminated structure of the battery cells, an adhesive member, for example, a cohesive type adhesive agent such as a double-sided tape or a chemical adhesive agent coupled by a chemical reaction during coupling, is attached to the surface of the battery case, and the battery cells are stacked one on another to form a medium- to large-sized battery module.

However, when this type of the adhesive member is used for a long period of time, the adhesive component is deteriorated and thus, the adhesive strength may be significantly reduced. In addition, the double-sided tape requires continuous management during the process because defects are occurred, such as the problem that the tape is not transferred or is stretched, and the unit price is high which results in a reduction in profitability.

DETAILED DESCRIPTION OF THE INVENTION

Technical Problem

The present disclosure has been made to solve the above-mentioned problems, and an object of the present disclosure to provide a battery cell assembly that can reduce defects in the process and improve profitability by using a one-component type liquid material capable of replacing a double-sided tape, and a method of manufacturing the same.

However, the problem to be solved by embodiments of the present disclosure is not limited to the above-described problems, and can be variously expanded within the scope of the technical idea included in the present disclosure.

Technical Solution

A battery cell assembly according to one embodiment of the present disclosure comprises a plurality of battery cells that are stacked in one direction, battery cells adjacent to each other among the plurality of battery cells being coupled by a one-component material, wherein the one-component material is an alcohol-based material or a water-based material.

The one-component material may include at least two pattern portions parallel to each other on one surface of the battery cell.

The one-component material may be configured to be physically separated or separated using a chemical material.

A battery module according to another embodiment of the present disclosure may comprise the above-mentioned battery cell assembly.

A method of manufacturing a battery cell assembly according to yet another embodiment of the present disclosure comprises a step of coupling battery cells adjacent to each other among the plurality of battery cells that are stacked in one direction, using a one-component liquid material, wherein the one-component liquid material is coated onto at least one battery cell of the battery cells adjacent to each other by a spray-coating method.

The one-component liquid material is a one-component liquid adhesive agent or a one-component liquid cohesive agent, the one-component liquid adhesive agent is an alcohol-based adhesive agent, and the one-component liquid cohesive agent may be a water-based cohesive agent.

The step of connecting the battery cells adjacent to each other using the one-component liquid material may include using a spray valve to spray the one-component liquid material from a lower part of one of the battery cells adjacent to each other toward the respective battery cell, thereby coating the one-component liquid material onto a lower surface of the respective battery cell.

The step of coupling the battery cells adjacent to each other using the one-component liquid material may further include a step of automatically transferring the battery cells adjacent to each other to a spray station by a conveyor; and a step of spraying the one-component liquid material on the lower surface of the respective battery cell while moving a spray valve in a state where the respective battery cell is fixed.

The method of manufacturing the battery cell assembly may further include a step of picking up an upper surface of the respective battery cell, so that the plurality of battery cells are stacked.

The one-component liquid material may be a water-based adhesive agent, and the method may further include a step of automatically transferring the respective battery cell coated by the one-component liquid material to a drying station by a conveyor, and then drying the one-component liquid material.

In the step of drying the one-component liquid material, a drying condition may be set such that a surface temperature of the respective battery cell is lower than a driving temperature of the respective battery cell.

The step of drying the one-component liquid material may use a hot air or an ultraviolet irradiation method.

Advantageous Effects

According to the embodiments, by replacing the double-sided tape with a one-component type liquid material, defects caused by using a conventional double-sided tape can be reduced.

Also, unlike the conventional one, by spraying a one-component type liquid material toward the lower surface of the battery cell, the space utilization in the process can be increased and the interference with other mechanical devices can be eliminated.

Further, by using the one-component type liquid material, the step of mixing a stock solution and a curing agent required for the two-component type liquid adhesive agent can be eliminated to reduce the cost.

In addition, by using the liquid material, it is possible to realize adhesive shapes having various patterns according to the width of the battery cell.

DETAILED DESCRIPTION OF THE EMBODIMENTS

Figure 1:
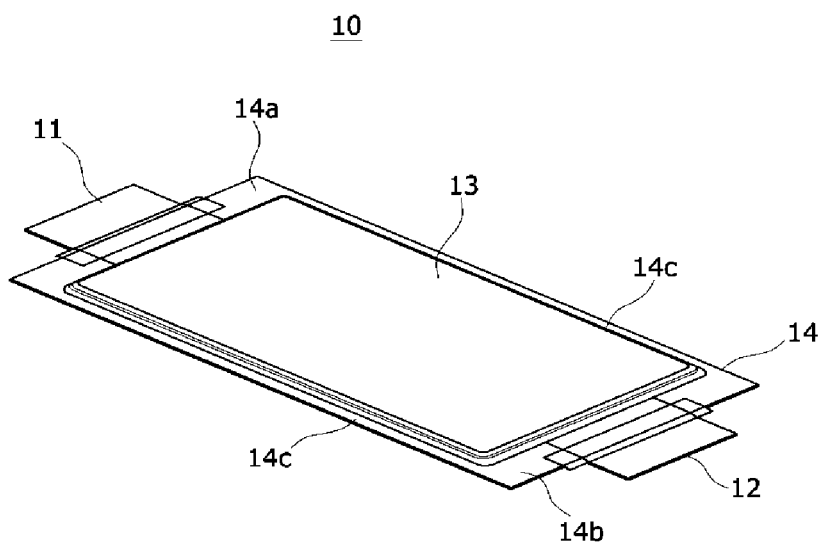
FIG. 1 is a perspective view showing a conventional pouch-shaped battery.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIGS. 2 to 6 are views showing a method of manufacturing a battery cell assembly according to an embodiment of the present disclosure.

Figure 2:
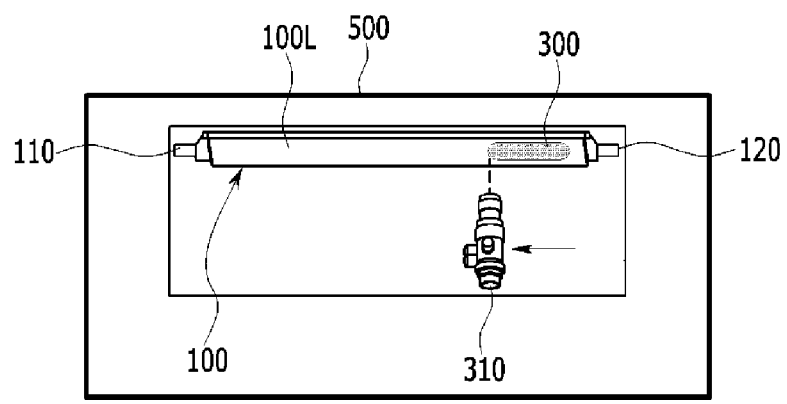
FIGS. 2 to 6 are views showing a method of manufacturing a battery cell assembly according to an embodiment of the present disclosure.

Referring to FIG. 2, the battery cell 100 according to the present embodiment has a structure in which two electrode leads 110 and 120 having different polarities are opposed to each other and protrude from one end and the other end of the battery body, respectively, and is manufactured by adhering both ends and of the battery case and both side surfaces connecting them in a state when the electrode assembly is housed in the battery case. The battery case is generally composed of a laminated structure of a resin layer/metal thin film layer/resin layer.

The method for manufacturing a battery cell assembly according to the present embodiment may include a step of automatically transferring a battery cell 100 to a spray station 500 by a conveyor. Here, the conveyor is a mechanical device that automatically and continuously conveys between a certain distance, and for example, belt conveyors or roller conveyors may be used. The conveyor is a generally well-known mechanical device, so its illustration will be omitted.

The battery cell 100 that has been transferred to the spray station 500 can move according to the input coordinate value preset by a spray valve 310 in a state where its position is fixed. At this time, the spray valve 310 sprays an adhesive agent 300 from the lower part of the battery cell 100 toward the battery cell 100, so that the liquid material 300 is coated onto the lower surface 100L of the battery cell. A general spraying process is a method in which the material sprayed by the spray valve is sprayed toward an object located at the lower part from the upper part of the object to be reached, but in the present embodiment, since the spray direction is reversed compared to the conventional one, there is an advantage that the process utilization in the process is improved and interference with other devices is eliminated.

Figure 3:
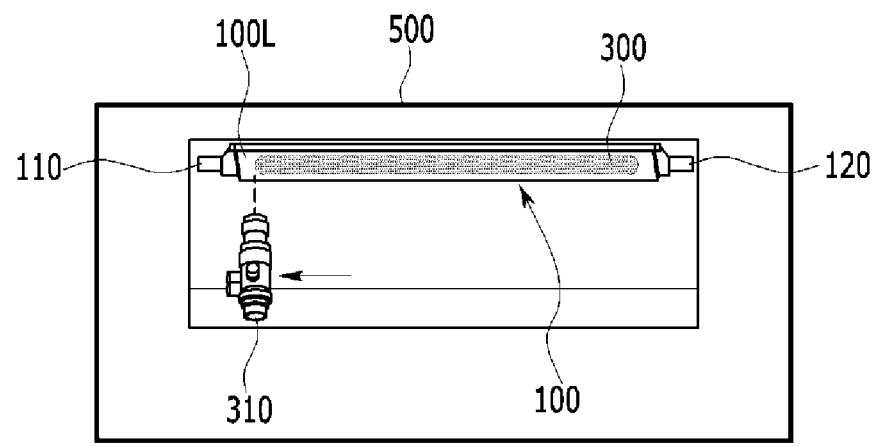

As an example, as shown in FIGS. 2 and 3, while the spray valve 310 moves from the lower surface 100L of the battery cell adjacent to the positive electrode lead 120 toward the lower surface 100L of the battery cell of the negative electrode lead 110, it can spray the liquid material 300. The spray valve 310 may use a circular pattern spray or a fan pattern spray, depending on the width of the battery cell 100.

The liquid material 300 according to the present embodiment uses a one-component type liquid material, and the one-component type liquid material may be a one-component type liquid adhesive agent or a one-component type liquid cohesive agent. At this time, the one-component type liquid adhesive agent may be an alcohol-based adhesive agent, and the one-component type liquid cohesive agent may be a water-based adhesive agent. The alcohol-based adhesive agent has quick initial curing and can detach from neighboring battery cells using chemical materials. Even after detachment, the adhesive properties can be maintained. The water-based cohesive agent is an environmentally friendly material, and it can detach from adjacent battery cells by physical force, and the cohesive properties can be maintained even after detachment.

Figure 4:
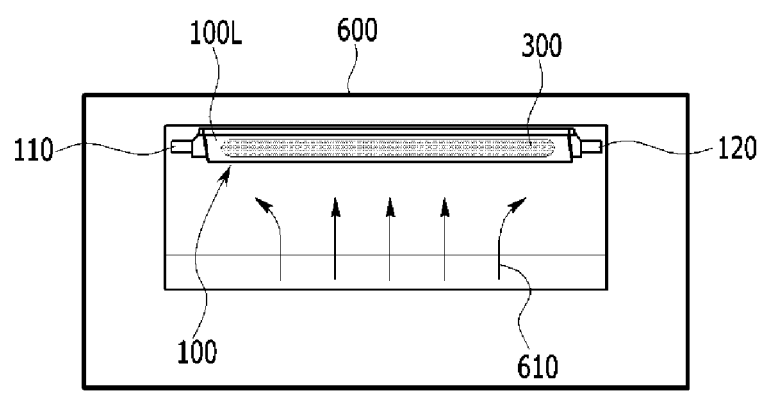

Referring to FIG. 4, when the one-component type liquid material 300 according to the present embodiment is a water-based adhesive agent, the method may further include a step of automatically transferring the battery cell 100 coated by the liquid substance 300 to the drying station 600 by a conveyor and then drying the liquid material 300. In the present embodiment, hot air 610 from a hot air dryer was used to dry the liquid material 300, but an ultraviolet irradiation method can also be used. In the step of drying the liquid material 300, the drying condition is preferably set such that the surface temperature of the battery cell is lower than the driving temperature of the battery cell.

In another embodiment, when the one-component type liquid material 300 is an alcohol-based adhesive agent, a separate curing process is unnecessary, and thus, the above-described drying process may be omitted.

Figure 5:
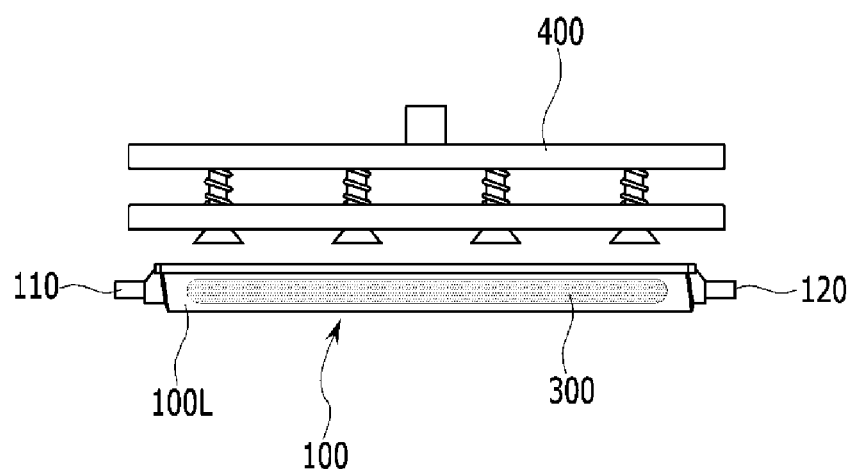
Figure 6:
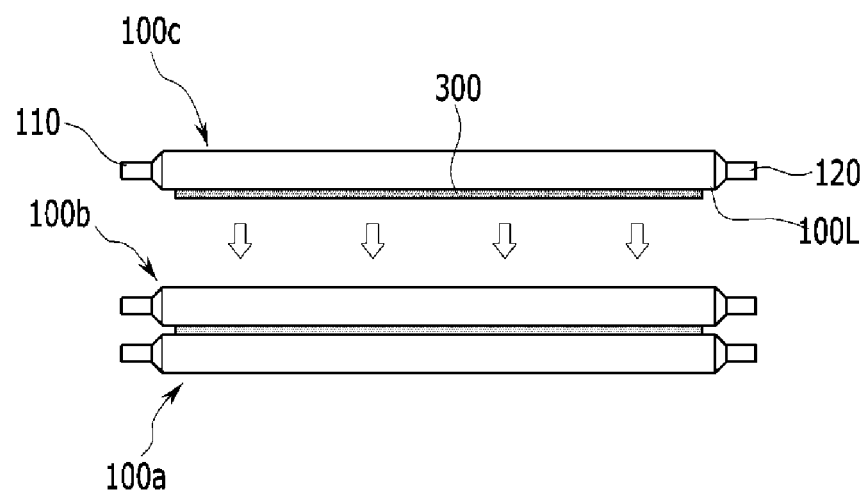

Referring to FIGS. 5 and 6, the method of manufacturing a battery cell assembly according to the present embodiment may further include a step of picking up the upper surface of the battery cell 100, so that the plurality of battery cells are stacked. The upper surface of the battery cell 100 may be a surface corresponding to the lower surface 100L of the battery cell on which the liquid material 300 is formed, and may be a surface on which the liquid material 300 is not formed. The battery cell assembly according to the present embodiment includes a first battery cell 100a, a second battery cell 100b which is adhered on the first battery cell 100a by the one-component type liquid material 300, and a third battery cell 100c which is stacked on the second battery cell 100b. In this way, a plurality of battery cells are stacked to form a battery cell assembly, and electrode leads of the plurality of battery cells may be electrically connected.

A pickup robot 400 may be used to pick up the upper surface of the battery cell 100. The pickup robot 400 may perform a lamination process so that a preset coordinate value is input to stably pick up the upper surface of the battery cell 100 and adhere to adjacent battery cells.

According to the method of manufacturing a battery cell assembly according to the present embodiment as described above, it is possible to remove a solid mass generated due to the non-transfer of the conventional double-sided tape or the stretching of the tape.

Figure 7:
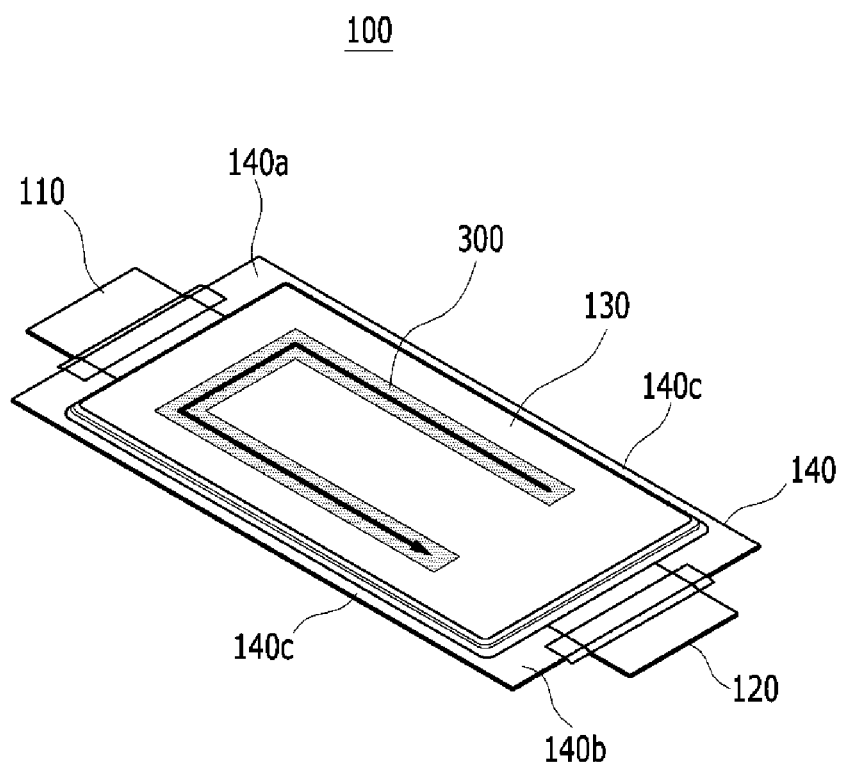
FIG. 7 is a perspective view showing a battery cell assembly according to another embodiment of the present disclosure.

FIG. 7 is a perspective view of a battery cell assembly according to another embodiment of the present invention.

Referring to FIG. 7, the battery cell 100 according to the present embodiment has a structure in which two electrode leads 110 and 120 are opposite to each other and protrude from one end 140a and the other end 140b of the battery body 130, respectively, and can be manufactured by adhering both ends 140a and 140b of the battery case 140 and both side surfaces 140c connecting them in a state when the electrode assembly (not shown) is housed in the battery case 140. Thereafter, the liquid material 300 may be formed on the lower surface of the battery cell 100 according to the method described in FIGS. 2 to 6.

The figure shown in FIG. 7 may be a state in which the one-component type liquid material 300 is formed on the lower surface of the battery cell 100 and then turned upside down. According to the manufacturing method according to the embodiment described above, one liquid material 300 pattern extending long in one direction of the battery cell 100 may be formed, but as a modified embodiment, the shapes of the liquid material 300 having various patterns as described below can also be realized.

At this time, according to the present embodiment, as shown in FIG. 7, a pattern of a "⊏" shaped liquid material 300 may be formed by changing the coating shape according to the spraying method. The liquid material 300 according to the present embodiment may be formed of a one-component type liquid material, and the one-component type liquid material may form at least two parallel pattern portions on one surface of the battery cell 100. In addition to the "⊏" shape, it is possible to realize the shape of the liquid material 300 having various patterns according to the width of the battery cell. The liquid material 300 becomes an adhesive layer between adjacent battery cells 100 after drying or curing.

The battery cell assembly according to various embodiments described above may be combined with a bus bar, a bus bar frame, a case, and the like to form a battery module.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell
300: one-component type liquid substance
310: spray valve
400: pickup robot
600: drying station

The invention claimed is:
1. A method of manufacturing a battery cell assembly in which a plurality of battery cells are stacked, the method comprising:
 a step of coupling battery cells adjacent to each other among the plurality of battery cells using a one-component liquid material,
 wherein the one-component liquid material is coated onto at least one battery cell of the battery cells adjacent to each other by a spray-coating method, and
 wherein the step of coupling the battery cells adjacent to each other using the one-component liquid material includes using a spray valve to spray the one-component liquid material from a lower part of one of the battery cells adjacent to each other toward the respec- tive battery cell, thereby coating the one-component liquid material onto a lower surface of the respective battery cell.

2. The method of manufacturing the battery cell assembly according to claim 1, wherein
the one-component liquid material is a one-component liquid adhesive agent or a one-component liquid cohesive agent.

3. The method of manufacturing the battery cell assembly according to claim 1, wherein the step of coupling the battery cells adjacent to each other using the one-component liquid material further comprises:
a step of automatically transferring the battery cells adjacent to each other to a spray station by a conveyor; and
a step of spraying the one-component liquid material on the lower surface of the respective battery cell while moving a spray valve in a state where the respective battery cell is fixed.

4. The method of manufacturing the battery cell assembly according to claim 3, further comprising picking up an upper surface of the respective battery cell, so that the plurality of battery cells are stacked.

5. The method of manufacturing the battery cell assembly according to claim 3, wherein the one-component liquid material is a water-based adhesive agent, and the method further includes a step of automatically transferring the respective battery cell coated by the one-component liquid material to a drying station by a conveyor, and then drying the one-component liquid material.

6. The method of manufacturing the battery cell assembly according to claim 5, wherein in the step of drying the one-component liquid material, a drying condition is set such that a surface temperature of the respective battery cell is lower than a driving temperature of the respective battery cell.

7. The method of manufacturing the battery cell assembly according to claim 5, wherein the step of drying the one-component liquid material uses a hot air or an ultraviolet irradiation method.

8. The method of manufacturing the battery cell assembly according to claim 1, wherein
the one-component liquid material is a one-component liquid adhesive agent, and the one-component liquid adhesive agent is an alcohol-based adhesive agent.

9. The method of manufacturing the battery cell assembly according to claim 1, wherein
the one-component liquid material is a one-component liquid cohesive agent, and the one-component liquid cohesive agent is a water-based cohesive agent.

10. The method of manufacturing the battery cell assembly according to claim 1, wherein in the step of coupling, the spraying by the spray valve is performed in a circular pattern spray or a fan pattern spray.

* * * * *